(12) United States Patent
Ganapathiappan et al.

(10) Patent No.: US 8,778,073 B2
(45) Date of Patent: Jul. 15, 2014

(54) PHTHALOCYANINE DYE WITH EXTENDED CONJUGATION, INK AND DETECTION SYSTEM USING SAME

(75) Inventors: Sivapackia Ganapathiappan, Los Altos, CA (US); Zhang-Lin Zhou, Palo Alto, CA (US); Jayprakash C. Bhatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 334 days.

(21) Appl. No.: 13/126,337

(22) PCT Filed: Oct. 30, 2008

(86) PCT No.: PCT/US2008/081887
§ 371 (c)(1), (2), (4) Date: Apr. 27, 2011

(87) PCT Pub. No.: WO2010/050962
PCT Pub. Date: May 6, 2010

(65) Prior Publication Data
US 2011/0204234 A1 Aug. 25, 2011

(51) Int. Cl.
| | | |
|---|---|---|
| C09D 11/02 | (2014.01) |
| C09B 47/04 | (2006.01) |
| G01N 21/00 | (2006.01) |
| C09D 11/00 | (2014.01) |
| C09B 69/10 | (2006.01) |
| C09B 47/06 | (2006.01) |
| C09B 47/00 | (2006.01) |
| C09B 47/24 | (2006.01) |

(52) U.S. Cl.
CPC .............. C09B 69/108 (2013.01); C09B 47/045 (2013.01); C09D 11/328 (2013.01); C09B 47/062 (2013.01); C09B 47/00 (2013.01); C09B 47/24 (2013.01)

USPC ........ 106/31.49; 540/129; 540/131; 540/133; 540/139; 540/140; 250/338.5

(58) Field of Classification Search
CPC .. C09D 11/328; C09B 47/045; C09B 47/062; C09B 47/24; C09B 69/108
USPC ............... 106/31.49; 540/129, 131, 133, 139, 540/140; 250/338.5
See application file for complete search history.

(56) References Cited

U.S. PATENT DOCUMENTS 4,450,268 A  5/1984  Achar et al.
5,053,323 A * 10/1991  Shepherd et al. ............. 430/269

(Continued)

FOREIGN PATENT DOCUMENTS

CN   101049576 A   10/2007
CN   101070680 A   11/2007

(Continued)

OTHER PUBLICATIONS

International Search Report, Application No. PCT/US2008/081887, filed 30 Oct. 2008. Hewlett-Packard Development Company, LLP, report dated Jul. 22, 2009. Korea.

(Continued)

Primary Examiner — Helene Klemanski

(57) ABSTRACT

A phthalocyanine dye with extended conjugation includes one or both of a phthalocyanine component and a naphthalocyanine component and at least one water soluble substituent on an aryl group of the phthalocyanine dye. The extended conjugation of the phthalocyanine dye includes at least one benzene moiety of the component being one of (a) joined to an aryl group either indirectly using an alkylene linkage or directly, (b) joined to a benzene moiety of another of the components to form an oligomer of the components, and (c) a combination of (a) and (b). The extended conjugation shifts absorption of the phthalocyanine dye to greater than 800 nm.

20 Claims, 3 Drawing Sheets

(56) References Cited

U.S. PATENT DOCUMENTS

| | | | |
|---|---|---|---|
| 5,346,670 A | | 9/1994 | Renzoni et al. |
| 5,618,929 A | * | 4/1997 | Harrison et al. ............. 540/139 |
| 5,824,799 A | | 10/1998 | Buechler et al. |
| 7,074,351 B2 | | 7/2006 | Dobler et al. |
| 7,314,511 B2 | | 1/2008 | Campbell et al. |
| 7,322,927 B2 | | 1/2008 | Buechler et al. |
| 7,417,141 B2 | | 8/2008 | Vonwiller et al. |
| 7,419,537 B2 | | 9/2008 | Fujii et al. |
| 7,423,145 B2 | | 9/2008 | Vonwiller et al. |
| 7,470,315 B2 | * | 12/2008 | Vonwiller et al. .......... 106/31.49 |
| 7,658,792 B2 | * | 2/2010 | Indusegaram et al. ..... 106/31.49 |
| 7,841,537 B2 | * | 11/2010 | Starling et al. ................ 235/491 |
| 8,202,358 B2 | * | 6/2012 | Ganapathiappan et al. .......................... 106/31.49 |
| 8,226,757 B2 | * | 7/2012 | Ganapathiappan et al. .......................... 106/31.49 |
| 2007/0008392 A1 | | 1/2007 | Vonwiller et al. |
| 2008/0199732 A1 | * | 8/2008 | Lee et al. ...................... 540/129 |
| 2011/0069127 A1 | * | 3/2011 | Indusegaram et al. ........ 347/100 |
| 2011/0135815 A1 | * | 6/2011 | Ganapathiappan et al. .. 427/160 |
| 2012/0139994 A1 | * | 6/2012 | Ganapathiappan et al. .......................... 106/31.49 |

FOREIGN PATENT DOCUMENTS

| | | |
|---|---|---|
| JP | S6461289 A | 3/1989 |
| JP | 2000353553 A | 12/2000 |
| WO | 03062323 A1 | 7/2003 |
| WO | 2008006135 A1 | 1/2008 |
| WO | 2008006137 A1 | 1/2008 |
| WO | 2008046129 A1 | 4/2008 |

OTHER PUBLICATIONS

Kobayashi, N. et al. Dimers, trimers and oligomers of phthalocyanines and related compounds. Coordination Chemistry Reviews. Apr. 15, 2002, vol. 227, pp. 129-152.

Torres, T. et al. Phthalocyanines and related compounds: organic targes for nonlinear optical applications. Journal of Materials Chemistry. Aug. 1998, vol. 8, pp. 1671-1683.

Torres, T. et al. Role of Structural Factors in the Nonlinear Optical Properties of Phthalocyanines and Related compounds.Chemical Reviews. Sept. 1, 2004, vol. 104, pp. 3723-3750.

The extended European Search Report (Supplementary ESR) from the European Patent Office for counterpart foreign patent application No. PCT/US2008/081887, dated Jul. 18, 2013, (8 pages).

* cited by examiner

PHTHALOCYANINE DYE WITH EXTENDED CONJUGATION, INK AND DETECTION SYSTEM USING SAME

CROSS-REFERENCE TO RELATED APPLICATIONS

N/A

STATEMENT REGARDING FEDERALLY SPONSORED RESEARCH OR DEVELOPMENT

N/A

BACKGROUND

1. Technical Field

The invention relates to near infrared (NIR) absorbing dyes. In particular, the invention relates to one or both phthalocyanine and naphthalocyanine dyes with extended conjugation.

2. Description of Related Art

Phthalocyanine and naphthalocyanine are macrocylic compounds that have strong pigmenting power attributed to their alternating nitrogen and carbon atom central ring structures of porphyrin compounds (i.e., benzene-porphyrin and naphthalene-porphyrin compounds, respectively). As such, phthalocyanine and naphthalocyanine are useful in dyes with a plethora of applications in biology and chemistry as well as industry. The central nitrogen atoms of a pyrroline portion of the porphyrin compounds may be either complexed with a metal or are metal-free to provide further variations in color. For example, metal-free phthalocyanine has a blue-green color while copper-complexed phthalocyanine has a blue color (Pigment Blue 15). Other substitutions on the phthalocyanine and naphthalocyanine compounds invoke other colors as well. In general, these phthalocyanine dyes exhibit absorption at wavelengths up to 800 nm.

Phthalocyanine and naphthalocyanine are chemically stable compounds that are normally not soluble in water or aqueous solutions. Water soluble groups can be added to increase the water solubility of the phthalocyanine and naphthalocyanine compounds. Phthalocyanine and naphthalocyanine compounds are often made in a single step synthetic process from their precursors such as aromatic 1,2-dicyano- or 1,2-carboxylic acids or anhydrides and their corresponding metallic compounds. To solubilize either of their structures, one or both of highly ionic groups and soluble ethylene oxide groups must be attached to dissolve them in water. Unfortunately, commercial water soluble cyanine compounds with near IR absorption have relatively poor stability in water or aqueous solution. Any degradation in solution that changes their physical or chemical nature can destroy their conjugation, such that their characteristic absorption (color) may be lost.

Hence, a phthalocyanine dye with absorption greater than 800 nm that is water soluble and stable in aqueous solution over time would satisfy a long felt need.

BRIEF DESCRIPTION OF THE DRAWINGS

The various features of the embodiments of the present invention may be more readily understood with reference to the following detailed description taken in conjunction with the accompanying drawings, where like reference numerals designate like structural elements, and in which.

DETAILED DESCRIPTION

Figure 1A:
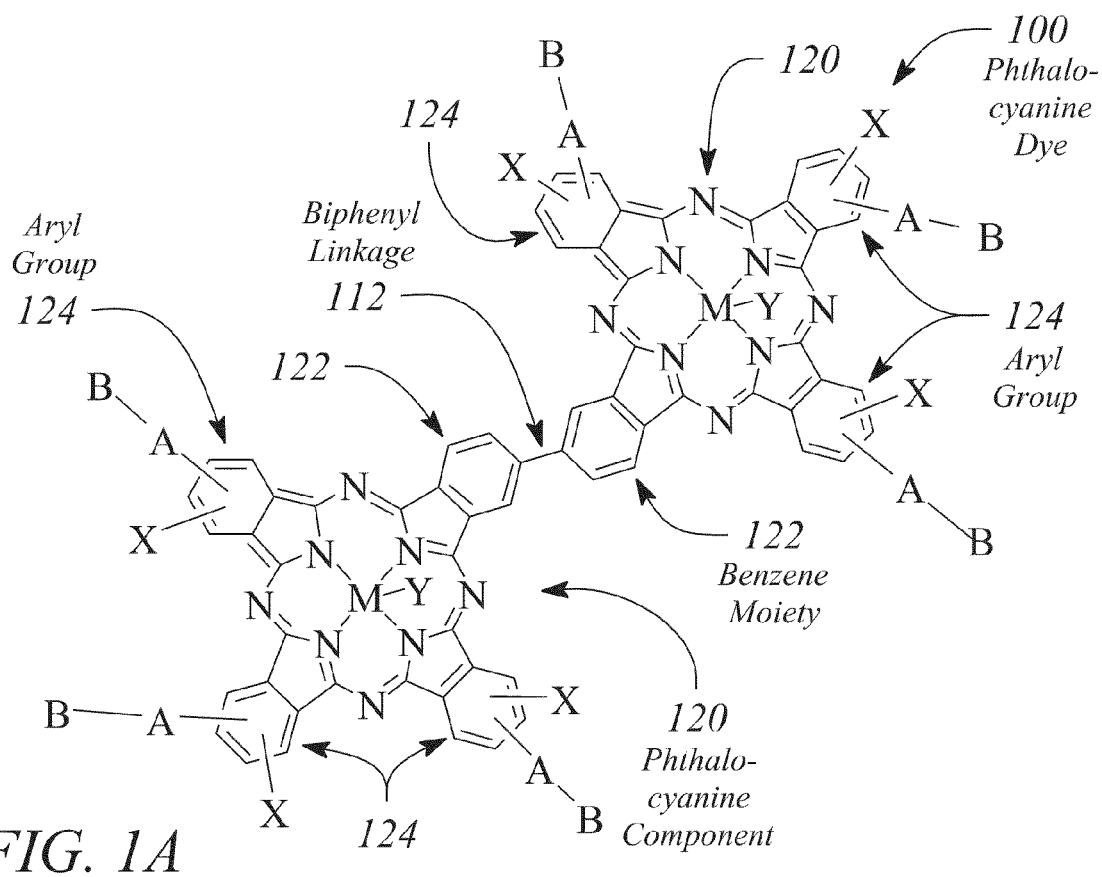
FIGS. 1A and 1B illustrate general chemical structures of a phthalocyanine dye, according to embodiments of the present invention.

Embodiments of the present invention employ a phthalocyanine dye having extended conjugation with a near-infrared (NIR) absorption greater than 800 nm. The phthalocyanine dye is one or more of water soluble, dispersible in aqueous solution, dispersible in aqueous blend solutions and dispersible in solvent soluble compounds. The phthalocyanine dye exhibits long term stability in such solutions and dispersions in a wide pH range. The phthalocyanine dye comprises one or both of a phthalocyanine component and a naphthalocyanine component and is referred to herein as a 'phthalocyanine dye' for simplicity of discussion. The solubility-dispersibility in various suspensions is attributed, in part, to one or more water soluble substituent groups on the respective phthalocyanine and naphthalocyanine components of the dye. Such water soluble substituent groups include one or both of ionic substituents and non-ionic substituents according to the various embodiments.

In some embodiments, the extended conjugation of the phthalocyanine dye comprises an oligomer of one or both of phthalocyanine and naphthalocyanine components or monomers (e.g., a dimer or a trimer). In some of these embodiments, the oligomer comprises a benzene moiety that is shared between one of adjacent phthalocyanine components, adjacent naphthalocyanine components and adjacent phthalocyanine and naphthalocyanine components. In others of these oligomer embodiments, the oligomer comprises a biphenyl linkage or junction between benzene moieties of the adjacent respective components. By 'respective components' it is meant herein one or both of phthalocyanine components and naphthalocyanine components.

In other embodiments, the extended conjugation of the phthalocyanine dye comprises an aryl group indirectly bonded to a benzene moiety of the respective component with an alkylene linkage (i.e., alkynyl linkage) that is defined herein as a hydrocarbon linkage with alternating carbon-carbon triple bonds with one or both of carbon-carbon single bonds and carbon-carbon double bonds (e.g., an acetylene linkage). The terms 'alkynyl linkage' and 'alkylene linkage' may be used interchangeably herein. In other embodiments, the extended conjugation of the phthalocyanine dye comprises an aryl group directly bonded to a benzene moiety of the respective component. In still other embodiments, the extended conjugation comprises a combination of an oligomer of the respective components and an aryl group bonded to at least one benzene moiety of the oligomer, either directly or indirectly as described above. In some embodiments, the absorption of the phthalocyanine dye described herein is in the near infrared (NIR) range from 700 nm to 1000 nm. In some embodiments, the extended conjugation of the phthalocyanine dye shifts the absorption to greater than 800 nm.

A NIR-absorbing phthalocyanine dye according to the various embodiments of the present invention comprises solubilizing groups including, but not limited to, one or more of sulfonates, carboxylates, sulfates, phosphates, ammonium ions, ethylene oxides, propylene oxides and combinations thereof that facilitate water solubility-dispersibility and stability in solution or suspension, as mentioned above. The NIR-absorbing phthalocyanine dye embodiments of the present invention find use in many different water-based systems such as coatings & ink. The NIR-absorbing phthalocyanine dye embodiments of the present invention find use in water-based ink systems, for example, inkjet inks for inkjet printers, for a variety of applications including, but not limited to, print quality, print authenticity, security, counterfeit assessment, RFID tags and barcodes, for example.

In the application involving print quality of inkjet printers, an inkjet print head is used to eject ink droplets very accurately in predetermined locations on a substrate. The quantity of nozzles in an inkjet print head can range from several nozzles to more than 400 nozzles, each for ejecting ink droplets. As a rule of thumb, the more nozzles present in the print head, generally the better the print quality and speed. However, any of the nozzles in the print head may get blocked or clogged from time to time, possibly due to particles in the inkjet ink dispersions or dry conditions. When a nozzle is clogged or partially blocked, the ink may at least streak on the substrate. Streaking ink equates to poor print quality. By incorporating the NIR-absorbing phthalocyanine dye embodiments of the present invention with the inkjet ink, an opportunity to monitor print quality and nozzle operation during printing is provided. The NIR-absorbing phthalocyanine dye embodiments of the present invention further provide opportunities to monitor and assess print authenticity, counterfeiting, as well as other areas that use ink, because of the unique absorption range of the NIR-absorbing phthalocyanine dye embodiments. The various substituents included in the chemical structures of the NIR-absorbing phthalocyanine dye embodiments render the dye embodiments soluble or dispersible in either water soluble ink formulations or solvent soluble ink formulations and blends thereof.

For simplicity herein, no distinction is made between the term 'species' as referring to a single item (e.g., a single species, etc.) and a plurality of such items unless such a distinction is necessary for proper understanding. Further, as used herein, the article 'a' is intended to have its ordinary meaning in the patent arts, namely 'one or more'. For example, 'a substituent' generally means one or more substituents and as such, 'the substituent' means 'the substituent(s)' herein. Also, any reference herein to 'top', 'bottom', 'upper', 'lower', 'up', 'down', 'left' or 'right' is not intended to be a limitation herein. Moreover, examples herein are intended to be illustrative only and are presented for discussion purposes and not by way of limitation.

In some embodiments of the present invention, a phthalocyanine dye is provided. The phthalocyanine dye has extended conjugation and comprises one or both of a phthalocyanine component and a naphthalocyanine component. The phthalocyanine dye further comprises a water soluble substituent attached to at least one aryl group of the phthalocyanine dye. By 'aryl group of the phthalocyanine dye', it is meant either a benzene ring moiety (i.e., benzene moiety or benzo moiety) of the respective component or a benzene ring-derived substituent group attached to a benzene moiety of the component (e.g., a phenyl group substituent). In some embodiments, more than one water soluble group is attached to an aryl group of the phthalocyanine dye. In some embodiments, a water soluble substituent is attached to each peripheral aryl group of the phthalocyanine dye. By 'peripheral aryl group' it is meant to exclude an inner benzene ring of a naphthalene portion of naphthalocyanine that is fused to a pyrrole portion of the naphthalocyanine component. In some embodiments, a water soluble substituent is attached to at least one peripheral aryl group of the respective component.

As described above, the extended conjugation comprises an oligomer of the respective component (i.e., one or both of phthalocyanine and naphthalocyanine) in some embodiments. In other embodiments, the extended conjugation comprises an aryl group directly linked to a benzene moiety of a respective component or indirectly linked to a benzene moiety of the respective component with an alkylene linkage. In still other embodiments, the extended conjugation comprises a combination of the oligomer and either the directly attached aryl group or the indirectly attached aryl group. Depending on the embodiment, the extended conjugation shifts absorption of the phthalocyanine dye to greater than 800 nm.

FIG. 1A illustrates a general chemical structure of an oligomer phthalocyanine dye 100 according to an embodiment of the present invention. The embodiment illustrated in FIG. 1A comprises a phthalocyanine component 120 joined to another phthalocyanine component 120 as an oligomer (e.g., dimer). The phthalocyanine components 120 illustrated in FIG. 1A are phthalocyanine by way of example. It should be noted that one or both of the phthalocyanine components 120 illustrated in FIG. 1A may be replaced with naphthalocyanine (not illustrated) and still be within the scope of the present invention. A junction 112 between adjacent phthalocyanine components 120 of the oligomer comprises a biphenyl linkage 112 according to the illustrated embodiment. As such, a benzene moiety 122 of one phthalocyanine component 120 is covalently bonded to a benzene moiety 122 of the other phthalocyanine component 120. In some embodiments (not illustrated), the phthalocyanine dye 100 may further comprise one or more additional phthalocyanine components that are linked to the phthalocyanine components 120 illustrated in FIG. 1A with above described biphenyl linkages to form a larger oligomer (e.g., trimer or tetramer). In some embodiments, the oligomer may be a hexamer. As such, the oligomer extends the conjugation of the phthalocyanine dye 100.

Figure 1B:
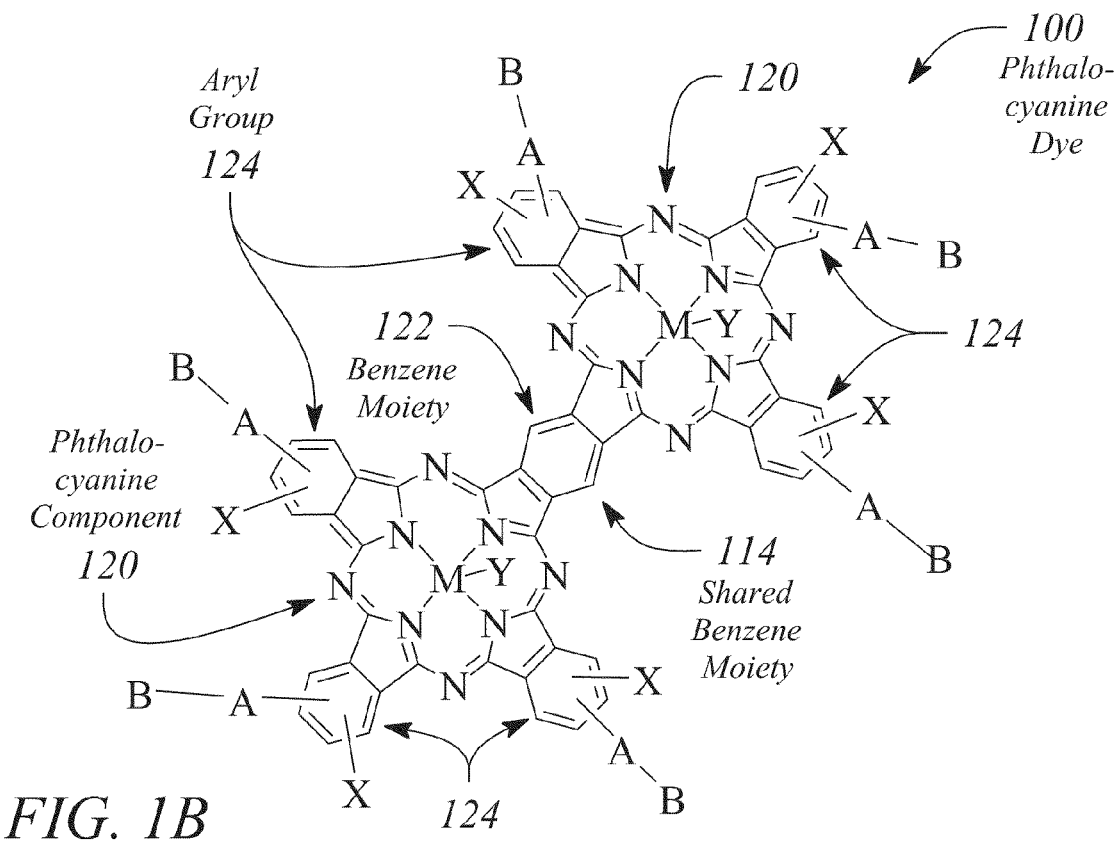

FIG. 1B illustrates a general chemical structure of an oligomer phthalocyanine dye 100 according to another embodiment of the present invention. The phthalocyanine dye 100 comprises one or both of phthalocyanine and naphthalocyanine components 120 essentially similar to that described above for FIG. 1A. However, different from the embodiment illustrated in FIG. 1A is that the respective components 120 of the oligomer share a benzene moiety 122 at a junction 114, as illustrated in FIG. 1B. The oligomer in FIG. 1B also extends the conjugation of the phthalocyanine dye 100. In some embodiments, the oligomer may have six repeating components, for example.

Figure 2A:
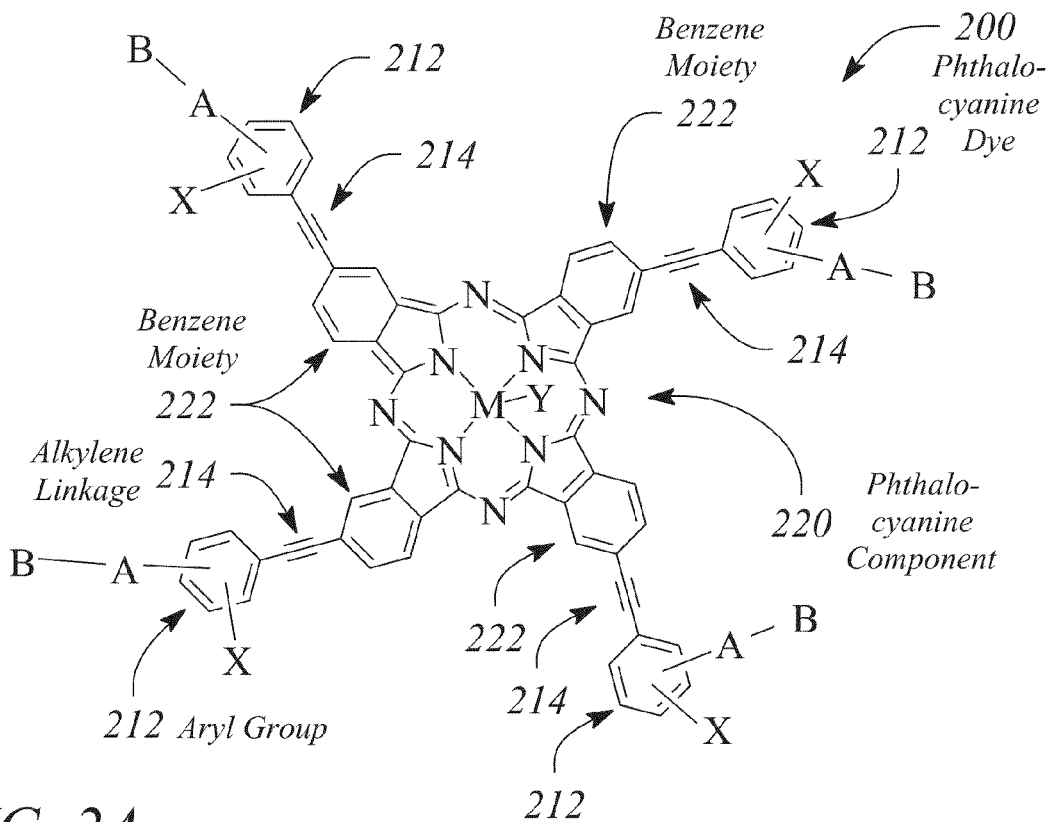
FIGS. 2A and 2B illustrate general chemical structures of a phthalocyanine dye, according to other embodiments of the present invention.

FIG. 2A illustrates a general chemical structure of a phthalocyanine dye 200 according to another embodiment of the present invention. The phthalocyanine dye 200 comprises a component 220 of one or both of phthalocyanine and naphthalocyanine. A phthalocyanine component 220 is illustrated in FIG. 2A by way of example. The phthalocyanine dye 200 further comprises an aryl group 212 indirectly linked to each benzene moiety 222 of the phthalocyanine component 220 with an alkynyl linkage 214. As such, the phthalocyanine dye 200 comprises four arylalkynyl groups 212, 214 that extend the conjugation of the phthalocyanine dye 200. FIG. 2A illustrates the four arylalkynyl groups as four phenylacetylene groups 212, 214 by way of example. For a naphthalocyanine-based dye (not illustrated in FIG. 2A), the four arylalkynyl groups of this embodiment may be attached to either benzene moiety of the naphthalene portion of naphthalocyanine component.

Figure 2B:
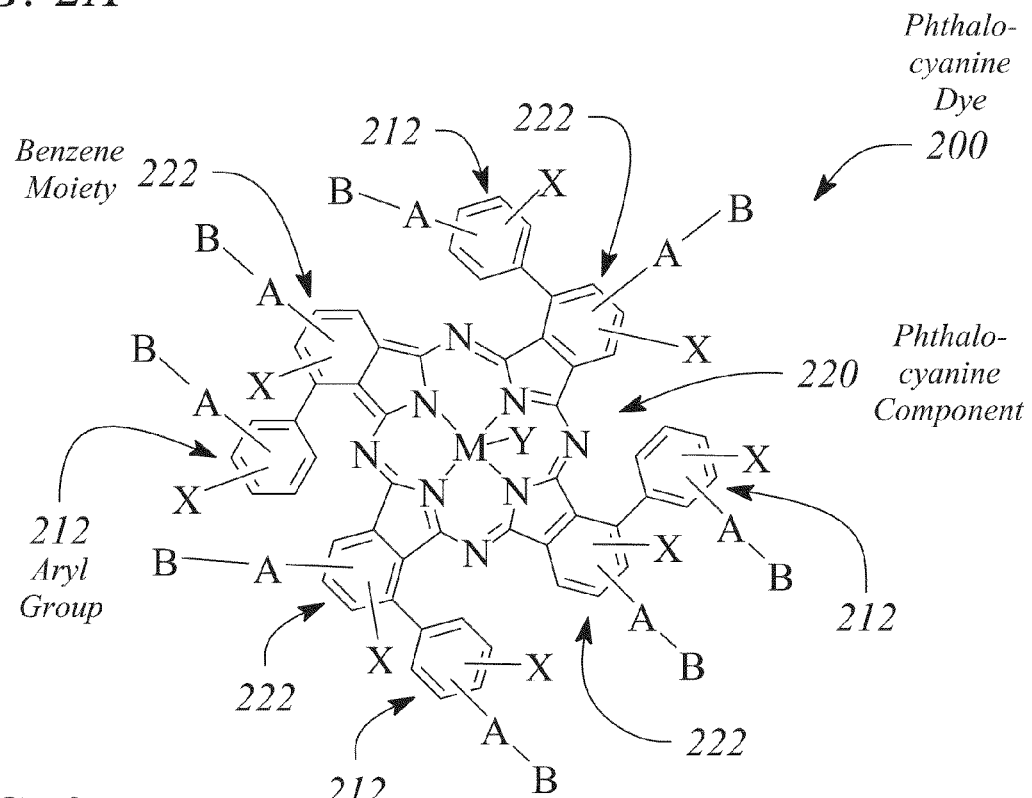

FIG. 2B illustrates a general chemical structure of a phthalocyanine dye 200 according to another embodiment of the present invention. The phthalocyanine dye 200 comprises a component 220 of one or both of phthalocyanine and naphthalocyanine. A phthalocyanine component 220 is illustrated in FIG. 2B by way of example. The phthalocyanine dye 200 further comprises an aryl group 212 directed linked to each benzene moiety 222 of the phthalocyanine component 220. As such, the phthalocyanine dye 200 comprises four aryl groups 212 that extend the conjugation of the phthalocyanine dye 200. For a naphthalocyanine-based dye (not illustrated in FIG. 2B), the four aryl groups of this embodiment may be attached to either benzene moiety of the naphthalene portion of naphthalocyanine component.

Further illustrated in FIGS. 1A, 1B, 2A and 2B are a substituent X group and a substituent A-B group attached to various aryl groups 124, 212, 222 of the phthalocyanine dyes 100, 200, respectively. In some embodiments, one or both of such substituent groups X and A-B are attached to one or more of the benzene moieties 124, 222 of the respective component 120, 220. In other embodiments, one or both of such substituent groups X and A-B are attached to one or more of the aryl substituents 212 of the phthalocyanine dye 200. In yet other embodiments, one or both of such substituent groups X and A-B are attached to at least one of both the benzene moieties 124, 222 of the respective phthalocyanine or naphthalocyanine component 120, 220 and the aryl substituents 212 of the phthalocyanine dye 200. The substituent group X is a soluble group that at least provides water solubility-dispersibility to the phthalocyanine dye 100, 200. The substituent group X is independently selected from one or more of $COOZ$, $SO_3Z$, $PO_3Z$, $NR_3^+Y^-$, and $(CH_2CH_2O)_mCH_3$, where Z is independently selected from hydrogen, a monovalent metal ion, and $NR_4^+$. R is independently selected from hydrogen, an alkyl group and an aryl group. $Y^-$ is selected from one of a halogen, sulfate, sulfonate and another negative species, and m ranges from 1 to 500.

The substituent group A-B provides a variety of functionalities or properties to the phthalocyanine dye 100, 200. The substituent group A-B comprises group A, which is a divalent linking group that independently includes one or a combination of oxygen, nitrogen, sulfur and carbon. In some embodiments, the divalent linking group A is independently selected from $O$, $CH_2$, $NH$, $COO$, $CONH$, $CO$, $SO_3$ and $SO_2NH$. The substituent group A-B further comprises group B linked to the divalent group A. The group B is a monovalent group independently selected from one of hydrogen and a hydrocarbon-containing group. In some embodiments, the hydrocarbon-containing group is selected from alkyl, substituted alkyl, aryl and substituted aryl.

In some embodiments, the substituent group A-B independently further provides one or both of water solubility and water dispersibility. In some embodiments, the substituent group A-B further provides one or both solvent solubility and solvent dispersibility in non-aqueous solutions. In still other embodiments, one or both of the substituent group X and the substituent group A-B provide one or both of solubility and dispersibility in blend solutions or suspensions.

In some embodiments, the more substituent groups X attached to the phthalocyanine dye 100, 200, then the greater the respective solubility and dispersibility of the phthalocyanine dye 100, 200. Moreover, greater respective solubility and dispersibility may increase an extinction coefficient of the phthalocyanine dye 100, 200 in some embodiments. The extinction coefficient defines how strongly a chemical species will absorb light at a given wavelength either per mass, per mole or per concentration. As such, an increased extinction coefficient means a smaller quantity of the phthalocyanine dye may be used for a desired application. In some embodiments, most aryl groups (i.e., 124, 212, and some 222) of the phthalocyanine dye 100, 200 may have a minimum of one substituent group X or at least one substituent X in the whole structure with a maximum of two X groups on each benzene ring for water solubility-dispersibility. In addition, each hydrogen in the respective aryl group (i.e., 124, 212, and some 222) of the phthalocyanine dye 100, 200 may be replaced with a substituent group A-B. Moreover, the aryl group 212 that provides extended conjugation to the phthalocyanine dye 200 may have more than one substituent group X and more than one substituent group A-B.

Further illustrated in FIGS. 1A, 1B, 2A and 2B is a substituent group M-Y shown complexed at the center the phthalocyanine component 120, 220, respectively. In some embodiments, the M is selected from a metal and hydrogen. When the M is hydrogen, no Y group is present and the phthalocyanine component is said to be metal-free. However, when the M is a metal, the metal is either a divalent, trivalent metal or a tetravalent metal complexed with the nitrogen atoms of the pyrrole moieties at the nucleus of the phthalocyanine component 120, 220. In some embodiments, the metal M is indium (In). Moreover, when the M is a trivalent metal, the linked group Y is selected from halogen, hydroxyl, $OSO_3Z$, and $OCOR$, where Z is selected from a hydrogen ion, a monovalent metal ion, and $NR_4^+$, and where R is independently selected from hydrogen, alkyl, aryl, a substituted alkyl, and a substituted aryl. Likewise, if the metal M is tetravalent, there will be two groups Y of the above mentioned species. The linked Y group provides one or more of further solubility, further dispersibility and other functionality including, but not limited to, changing the absorption range of the phthalocyanine dye 100, 200 for the purposes of some embodiments of the present invention.

In another embodiment of the present invention, an inkjet ink formulation is provided. The inkjet ink formulation comprises an inkjet ink and a phthalocyanine dye with extended conjugation dispersed or dissolved in the inkjet ink. The phthalocyanine dye is stable in the inkjet ink for a shelf life of the inkjet ink. In the inkjet ink formulation, the phthalocyanine dye has a NIR absorption that is shifted to greater than 800 nm, which is distinguishable from any absorption in the visible range of spectrum (400-750 nm) that the inkjet ink might have. The inkjet ink formulation embodiment of the present invention has numerous applications including, but not limited to print quality and counterfeit assessment, as mentioned above.

In some embodiments, the inkjet ink is a water soluble inkjet ink (i.e., aqueous ink) based on a mixture of water, glycol and dyes or pigments, for example for most everyday printing applications. In other embodiments, the inkjet ink is a solvent-based ink made with volatile organic compounds (VOC). The solvent-based inks find use in printing of vinyl substrates (e.g., billboards and banners). In still other embodiments, the inkjet ink is either a UV-curable ink that comprises acrylic monomers with an initiator that cured by exposure to strong UV-light or a dye sublimation ink that comprises a sublimation dye and is used to print directly or indirectly on to fabrics having polyester fibers, for example. All of the inkjet inks provide a variety of colors using either the additive red-green-blue (RGB) color model or the subtractive cyan-magenta-yellow-key (CMYK) color model.

In some embodiments of the inkjet ink formulation, the phthalocyanine dye is any of the phthalocyanine dye 100, 200 embodiments described herein. For example, the inkjet ink formulation comprises an aqueous inkjet ink and any one or more of the phthalocyanine dyes illustrated in FIGS. 1A, 1B, 2A and 2B. In this example, the phthalocyanine dye of the inkjet ink formulation comprises a minimum of one water soluble substituent group on each aryl group of phthalocyanine dye with a maximum number of possible substituents on each benzene ring. In some embodiments, the phthalocyanine dye is any of the phthalocyanine dyes made according to any of the Examples below.

In another embodiment of the present invention, a detection system for a NIR-absorbing phthalocyanine dye with extended conjugation is provided. The detection system provides detection of the phthalocyanine dye in a variety of applications, as mentioned above from print quality to counterfeit assessment, for example. In some embodiments, the detection system is incorporated into an inkjet printer.

Figure 3:
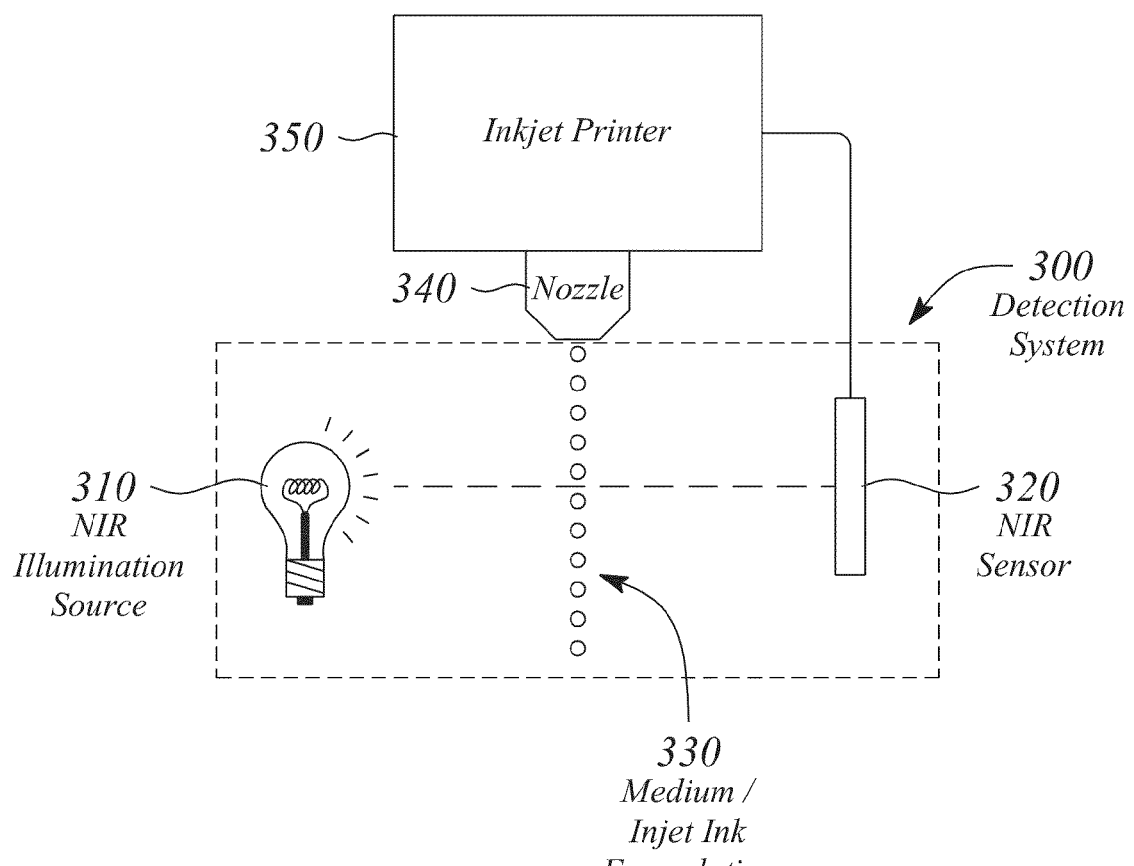
FIG. 3 illustrates a block diagram of a detection system for an inkjet printer, according to an embodiment of the present invention.

FIG. 3 illustrates a block diagram of a detection system 300 for an inkjet printer. The detection system 300 comprises an NIR illumination source 310 that emits infrared light at a wavelength between 700 nm and 1000 nm. The NIR illumination source 310 may be light emitting diode (LED), for example. The detection system 300 further comprises an NIR sensor 320 that detects the infrared light from the NIR illumination source 310. The NIR sensor 320 may be a photodiode that detects radiation between 700 nm and 1000 nm of wavelength, for example. The detection system 300 further comprises a medium 330 that comprises an NIR-absorbing phthalocyanine dye with extended conjugation. In the embodiment illustrated in FIG. 3, the medium 330 is an inkjet ink 330. The inkjet ink 330 comprises the phthalocyanine dye with extended conjugation dispersed in the inkjet ink 330. As such, the inkjet ink 330 absorbs light in the NIR range. In some embodiments, the inkjet ink 330 absorbs light at greater than 800 nm. The inkjet ink 330 is dispensed through a nozzle 340 of an inkjet print head of an inkjet printer 350. The NIR illumination source 310 is directed at an output path of the nozzle 340 to illuminate the inkjet ink 330 that is dispensed by the nozzle 340. The NIR sensor 320 is directed at the output path and the illumination path.

In an example of detecting print quality from the inkjet printer 350, when the nozzle 340 of the inkjet print head is operating efficiently, the inkjet ink 330 emanates from the nozzle output in the output path. The light from the illumination source 310 is absorbed by the phthalocyanine dye in the inkjet ink 330 and the NIR sensor 320 does not detect a change in the light (or a change in an amount of light) from the illumination source 310. When the nozzle 340 becomes clogged, whether due to the inkjet ink 330 inside the nozzle 340 drying up or for another reason, little or no inkjet ink 330 is dispensed by the nozzle 340. The light from the NIR illumination source 310 is no longer absorbed if the inkjet ink 330 is not dispensed from the nozzle output. As such, NIR sensor 320 begins detecting the light (e.g., detects a change in either the light or an amount of the light) from the NIR illumination source 310. The detected light by the NIR sensor 320 triggers the NIR sensor 320 to communicate to the inkjet printer 350 that the nozzle 340 is not operating correctly. The inkjet printer 350 uses the communication from the NIR sensor 320 to compensate for the clogged nozzle 340, such that print quality from the inkjet printer is maintained.

In some embodiments, the phthalocyanine dye with extended conjugation in the detection system 300 is any of the phthalocyanine dye 100, 200 embodiments that are described herein. In some embodiments, the phthalocyanine dye is any of the Examples provide below.

EXAMPLES

Example 1

A phthalocyanine dye comprising a naphthalocyanine compound, in particular, an indium tetraphenyl naphthalocyanine sulfonate sodium salt was formulated. The naphthalocyanine compound has the following chemical structure, where R is $SO_3Na$:

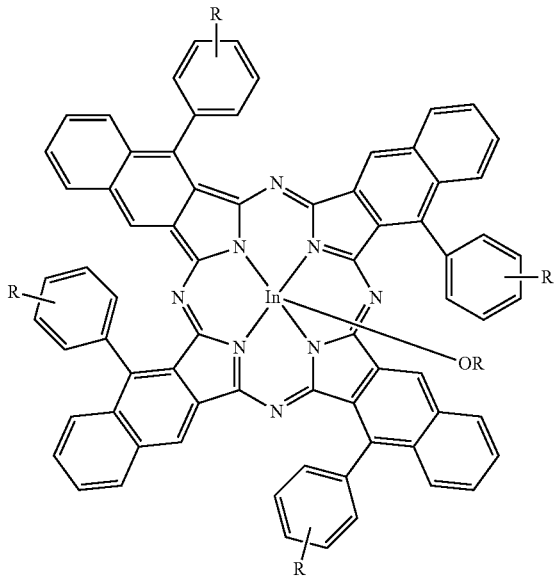

To make the naphthalocyanine compound of Example 1, the following ingredients were mixed and heated to 110° C. for 1 hour: 1 gram of 1-phenyl-2-3-naphthalenedicarboxylic anhydride; 0.2 grams of indium chloride; 0.14 grams of p-toluenesulfonic acid; and 6 grams of hexamethyldisilazane. Then, 1 gram of dimethyl formamide was added to the reaction mixture and the reaction mixture was heated to 150° C. for 16 hours. The reaction mixture was cooled and washed with isopropanol. The product obtained from the isopropanol-washed mixture was sulfonated with 12 grams of fuming sulfuric acid having 20% sulfur trioxide content. The sulfonated mixture was stirred at ambient temperature under nitrogen for 4 days and then poured in crushed ice. The sulfonated mixture was washed with cold water to remove excess sulfuric acid. The washed mixture was neutralized with 50% sodium carbonate solution to a pH of 7.5. The product after sulfonation was readily soluble in water. The product obtained was the sulfonated indium tetraphenyl naphthalocyanine sulfonate with sodium ions as counter ions, as illustrated above.

The extended conjugation of the phthalocyanine dye embodiment formulated in Example 1 comprises a phenyl substitution on each first benzene moiety of the naphthalocyanine component (i.e., the benzene moiety of naphthalene portion fused to pyrrole portion). A UV/VIS spectrum resulted in up to 840 nm wavelength absorption for the Example 1 product. To achieve water solubility or dispersibility, one water soluble substituent (e.g., —SO$_3$Na) is provided on each second benzene moiety of the naphthalocyanine component (i.e., the other benzene moiety of the naphthalene portion). Moreover, two water soluble substituents are provided on each phenyl substitution of the extended conjugation and one water soluble substituent is provided on the complexed indium at the center of the naphthalocyanine component. The location of the R groups on the various benzene rings illustrated in Example 1 is by way of example and not a limitation herein.

Example 2

A phthalocyanine dye comprising a phthalocyanine compound, in particular, an indium phenylacetylene phthalocyanine sulfonate sodium salt was formulated. The phthalocyanine compound has the following chemical structure, where M is In:

sulfonated mixture was stirred at ambient temperature under nitrogen for 4 days and then poured in crushed ice. The sulfonated mixture was washed with cold water to remove excess sulfuric acid. The washed mixture was neutralized with 50% sodium carbonate solution to a pH of 7.5. The product after sulfonation was readily soluble in water. The product obtained was the sulfonated indium phenylacetylene phthalocyanine sulfonate with sodium ions as counter ions, as illustrated above.

The extended conjugation of the phthalocyanine dye embodiment formulated in Example 2 comprises a phenylacetylene substitution on the each benzene moiety of the phthalocyanine component (i.e., the benzene moiety fused to a pyrrole portion of each isoindole part). In some embodiments, the phthalocyanine compound formulated in Example 2 may be combined with other phthalocyanine compounds and naphthalocyanine compounds, such as those described herein, to further extend conjugation. To achieve water solubility or dispersibility, one water soluble substituent is provided on each phenyl substitution of the extended conjugation

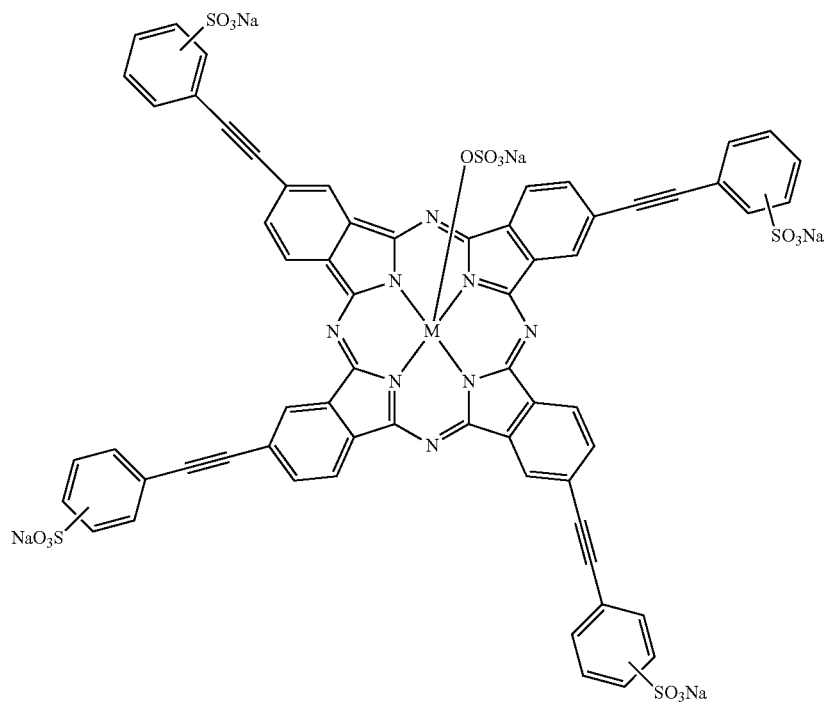

To make the phthalocyanine compound of Example 2, the following ingredients were mixed and heated to 110° C. for 1.5 hour: 2.71 grams of 4-phenylethynylphthalic anhydride, 0.6 of grams indium chloride, 0.42 of grams p-toluenesulfonic acid, and 18 grams of hexamethyldisilazane. Then, 5 grams of dimethyl formamide and 0.15 grams of ammonium molybdate were added to the reaction mixture and heated to 160 C for 19 hours. The reaction mixture was cooled and washed with isopropanol. The product obtained from the isopropanol-washed mixture was sulfonated with 18 ml of fuming sulfuric acid having 20% sulfur trioxide content. The and one water soluble substituent is provided on the complexed indium at the center of the phthalocyanine component.

Example 3

A phthalocyanine dye comprising a naphthalocyanine dimer compound, in particular, an indium hexaphenyldinaphthalocyanine sulfonate sodium salt was formulated, wherein two triphenylnaphthalocyanine components are joined by a biphenyl linkage. The naphthalocyanine dimer compound has the following chemical structure:

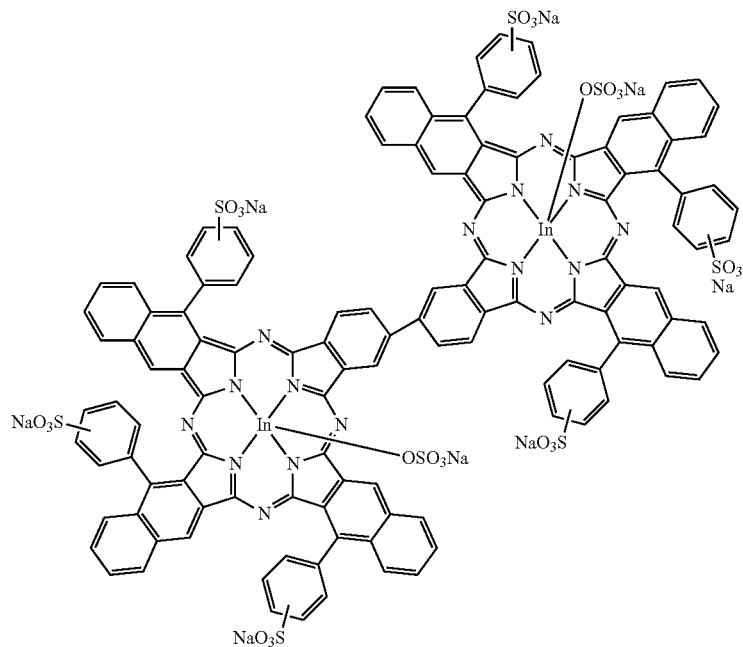

To make the naphthalocyanine compound of Example 3, the following ingredients were mixed and heated to 120° C. for 2 hour: 0.754 grams of 1-phenyl-2,-3-naphthalene dicarboxylic anhydride; 0.135 grams of 3,3',4,4'-biphenyltetracarboxylic dianhydride; 0.2 grams of indium chloride; 0.15 grams of p-toluenesulfonic acid; and 6 grams of hexamethyldisilazane. Then, 0.75 gram of dimethyl formamide and 0.01 gram of ammonium molybdate were added to the reaction mixture and the reaction mixture was heated to 150° C. for 17 hours. The reaction mixture was cooled and washed with isopropanol. The product obtained from the isopropanol-washed mixture was sulfonated with 12 grams of fuming sulfuric acid having 20% sulfur trioxide content. The sulfonated mixture was stirred at ambient temperature under nitrogen for 4 days and then poured in crushed ice. The sulfonated mixture was washed with cold water to remove excess sulfuric acid. The washed mixture was neutralized with 50% sodium carbonate solution to a pH of 7.5. The product after sulfonation was readily soluble in water. The product obtained was an indium hexaphenyldinaphthalocyanine sulfonate dimer with sodium ions as counter ions, as illustrated above.

The extended conjugation of the phthalocyanine dye embodiment formulated in Example 3 comprises an oligomer of naphthalocyanine components that are linked with a biphenyl linkage (e.g., as a dimer) between adjacent benzene moieties. The extended conjugation further comprises a phenyl substitution on each first benzene moiety of the naphthalene portions of the naphthalocyanine components of the formed dimer but for the biphenyl linked benzene rings. A UV/VIS spectrum resulted in up to 820 nm wavelength absorption for the Example 3 product. To achieve water solubility or dispersibility, one water soluble substituent is provided on each benzene moiety but for the linking benzene moieties of the biphenyl linkage. Moreover, a water soluble substituent may be provided on the complexed indium metal at the center of each naphthalocyanine component of the dimer compound.

Example 4

A phthalocyanine dye comprising another naphthalocyanine dimer compound, in particular, another indium hexaphenyldinaphthalocyanine sulfonate sodium salt was formulated, wherein two triphenylnaphthalocyanine components are joined by a fused or shared benzene moiety instead of a biphenyl linkage. The chemical structure of the naphthalocyanine dimer compound is shown below, where the complexed substituent M is In—OSO$_3$Na:

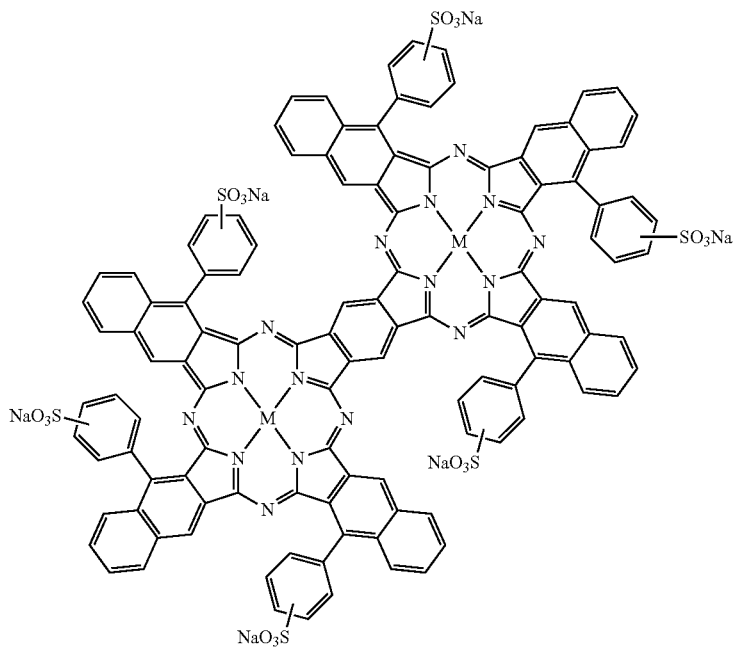

To make the naphthalocyanine dimer compound of Example 4, the following ingredients were mixed and heated to 120° C. for 2 hours: 0.1 gram of 1,2,4,5-benzenetetracarboxylic acid anhydride; 0.754 grams of 1-phenyl-2,-3-naphthalene dicarboxylic anhydride; 0.2 grams of indium chloride; 0.15 grams of p-toluenesulfonic acid; and 6 grams of hexamethyldisilazane. Then, 0.75 gram of dimethyl formamide and 0.01 grams of ammonium molybdate were added to the reaction mixture and the reaction mixture was heated to 150° C. for 17 hours. The reaction mixture was cooled and washed with isopropanol. The product obtained from the isopropanol-washed mixture was sulfonated with 12 grams of fuming sulfuric acid having 20% sulfur trioxide content. The sulfonated mixture was stirred at ambient temperature under nitrogen for 4 days and then poured in crushed ice. The sulfonated mixture was washed with cold water to remove excess sulfuric acid. The washed mixture was neutralized with 50% sodium carbonate solution to a pH of 7.5. The product after sulfonation was readily soluble in water. The product obtained was the sulfonated indium hexaphenyl dinaphthalocyanine sulfonate dimer with sodium ions as counter ions, as illustrated above.

The extended conjugation of the phthalocyanine dye embodiment formulated in Example 4 comprises an oligomer of naphthalocyanine components that are linked by a shared benzene moiety. The extended conjugation further comprises a phenyl substitution on each first benzene moiety of the naphthalene portions of the naphthalocyanine components of the formed dimer but for the shared benzene moiety. A UV/VIS spectrum resulted in up to 815 nm wavelength absorption for the Example 4 product. To achieve water solubility or dispersibility, one water soluble substituent is provided on each second benzene moiety of the naphthalene portion of the naphthalocyanine components but for the shared benzene moiety of the dimer. Moreover, two water soluble substituents are provided on each phenyl substitution of the extended conjugation and one water soluble substituent is provided on the complexed indium at the center of each naphthalocyanine component of the dimer.

Example 5

A phthalocyanine dye comprising a naphthalocyanine oligomer compound, in particular, an indium trinaphthalocyanine sulfonate sodium salt compound was formulated. The naphthalocyanine oligomer compound has the following chemical structure:

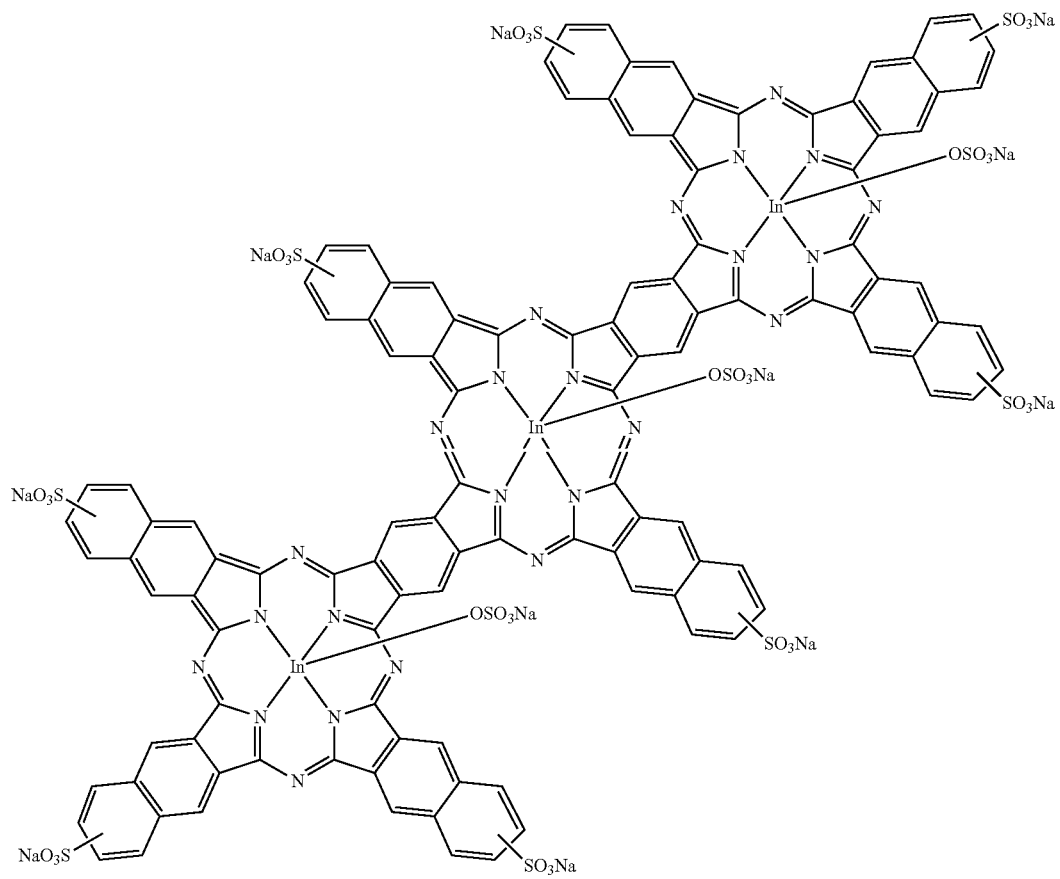

To make the naphthalocyanine oligomer compound of Example 5, 0.4 grams of 2,3-dicyanonaphthalene and 0.1 gram of 1,2,4,5-tetracyanobenzene were mixed in 1 ml of dimethylformamide and heated to 180° C. When the temperature reached 100 C, 0.187 grams of indium chloride and 0.05 grams of ammonium molybdate were added. The mixture was heated up to 3 hours. The reaction mixture was cooled and washed with isopropanol. The product obtained from the isopropanol-washed mixture was sulfonated with 4 ml of fuming sulfuric acid having 20% sulfur trioxide content. The sulfonated mixture was stirred at ambient temperature under nitrogen for 4 days and then poured in crushed ice. The sulfonated mixture was washed with cold water to remove excess sulfuric acid. The washed mixture was neutralized with 50% sodium carbonate solution to a pH of 7.5. The product after sulfonation was readily soluble in water. The product obtained was a trimer of indium naphthalocyanine sulfonate with sodium ions as counter-ions, as illustrated above.

The extended conjugation of the phthalocyanine dye embodiment formulated in Example 5 comprises a formed oligomer of naphthalocyanine components that share adjacent benzene moieties. A UV/VIS spectrum resulted in up to 850 nm wavelength absorption for the Example 5 product. To achieve water solubility or dispersibility, one water soluble substituent is provided on each benzene moiety but for the benzene moiety that links the naphthalocyanine components. Moreover, a water soluble substituent is provided on the complexed indium at the center of each naphthalocyanine component of the naphthalocyanine trimer compound.

All amounts in grams and milliliters (ml) mentioned above for each Example are approximate and not intended as a limitation herein. Moreover, sodium counter-ions are provided by way of example. Other counter ions may be used instead of sodium by replacing the sodium carbonate with other carbonates, bicarbonates or hydroxides, for example, in any of the Examples above. Moreover, the phthalocyanine and naphthalocyanine compounds of the Examples were sulfonated by way of example. Other water soluble substituents may be used instead of sulfonate by replacing the fuming sulfuric acid with a carboxylic acid or a phosphoric acid, for example, in any of the Examples above. In other embodiments, organic salts may be prepared using organic amines including, but not limited to, triethylamine, triethanolamine and hydroxyethylamine instead of the carbonates, bicarbonates or hydroxides. In addition, the positions of the water soluble substituents on the respective benzene rings in the Examples are provided by way of example. The water soluble substituents may be randomly present on those or other carbon atom positions of the various benzene rings, with a maximum of two water soluble substituents in each benzene ring, and still be within the scope of the Examples and any of the embodiments of the present invention.

Thus, there have been described embodiments of an NIR-absorbing phthalocyanine dye with extended conjugation. Further, embodiments of an inkjet ink and a detection system that employ the phthalocyanine dye have been described. It should be understood that the above-described embodiments are merely illustrative of some of the many specific embodiments that represent the principles of the present invention.

Clearly, those skilled in the art can readily devise numerous other arrangements without departing from the scope of the present invention as defined by the following claims.

What is claimed is:

1. A phthalocyanine dye with extended conjugation comprising:
   one or both of a phthalocyanine component and a naphthalocyanine component; and
   at least one water soluble substituent on an aryl group of the phthalocyanine dye,
   wherein the extended conjugation of the phthalocyanine dye comprises one of (a) at least three benzene moieties of the component each being joined to an aryl group indirectly using an alkynyl linkage, and (c) a combination of (a) and (b), wherein (b) is a benzene moiety of the component being directly joined to a benzene moiety of another of the components in a direct biphenyl linkage or shared between the respective components to form an oligomer of the components, the extended conjugation shifting absorption of the phthalocyanine dye to greater than 800 nm.

2. The phthalocyanine dye of claim 1, wherein the extended conjugation of the phthalocyanine dye comprises (c).

3. The phthalocyanine dye of claim 1, wherein the water soluble substituent is independently selected from the group consisting of COOZ, $SO_3Z$, $PO_3Z$, $NR_3^+Y^-$, and $(CH_2CH_2O)_m CH_3$, where Z is independently selected from the group consisting of hydrogen, a monovalent metal ion, and $NR_4^+$; R is independently selected from the group consisting of hydrogen, an alkyl group and an aryl group; Y is selected from the group consisting of a halogen, sulfate, sulfonate and another negative species, and m ranges from 1 to 500.

4. The phthalocyanine dye of claim 1, wherein the alkynyl linked aryl group is phenylacetylene, the phenyl moiety of the phenylacetylene comprising one or more of the water soluble substituent.

5. The phthalocyanine dye of claim 1, wherein one or both of a benzene moiety of the respective component and an aryl group of the phthalocyanine dye further comprises a substituent group comprising a divalent linking group that independently includes one of or a combination of oxygen, nitrogen, sulfur and carbon; and a monovalent group linked to the divalent group that is independently one of hydrogen and a hydrocarbon-containing group.

6. The phthalocyanine dye of claim 5, wherein the divalent linking group is independently selected from the group consisting of O, $CH_2$, NH, COO, CONH, CO, $SO_3$ and $SO_2NH$, and wherein the monovalent group is independently selected from the group consisting of hydrogen, an alkyl group, a substituted alkyl group, an aryl group and a substituted aryl group.

7. The phthalocyanine dye of claim 1, further comprising a metal complexed with a pyrrole moiety of the component at a nucleus of the component, the metal being one of a divalent metal, a trivalent metal or a tetravalent metal, and wherein the metal is further bonded to one or more groups selected from the group consisting of halogen, hydroxyl, $OSO_3Z$, and OCOR, where Z is selected from the group consisting of a hydrogen ion, a monovalent metal ion, and $NR_4^+$, and where R is independently selected from the group consisting of hydrogen, alkyl, aryl, a substituted alkyl, and a substituted aryl.

8. The phthalocyanine dye of claim 7, wherein the metal is indium.

9. The phthalocyanine dye of claim 1 comprising a phthalocyanine compound having a chemical structure of one of Formula III, Formula III with the chemical structure of any of Formula I, II and IV, and any combination thereof:

Formula I:

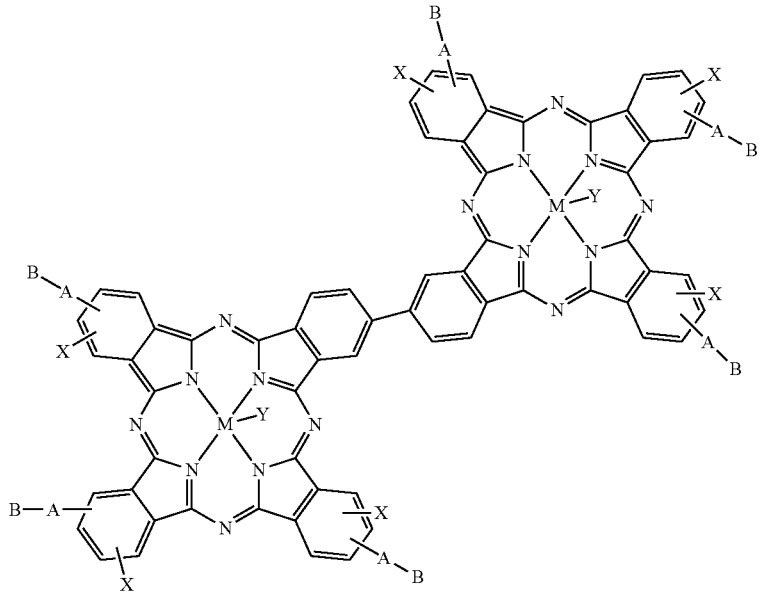

-continued
Formula II:
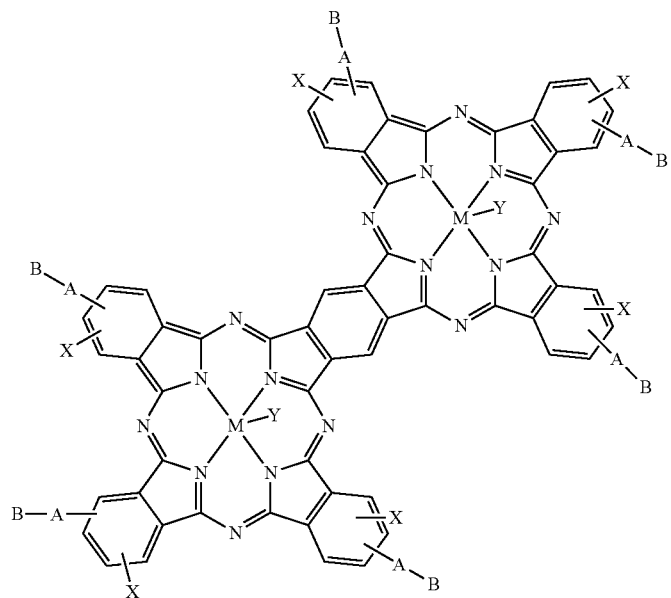
Formula III:
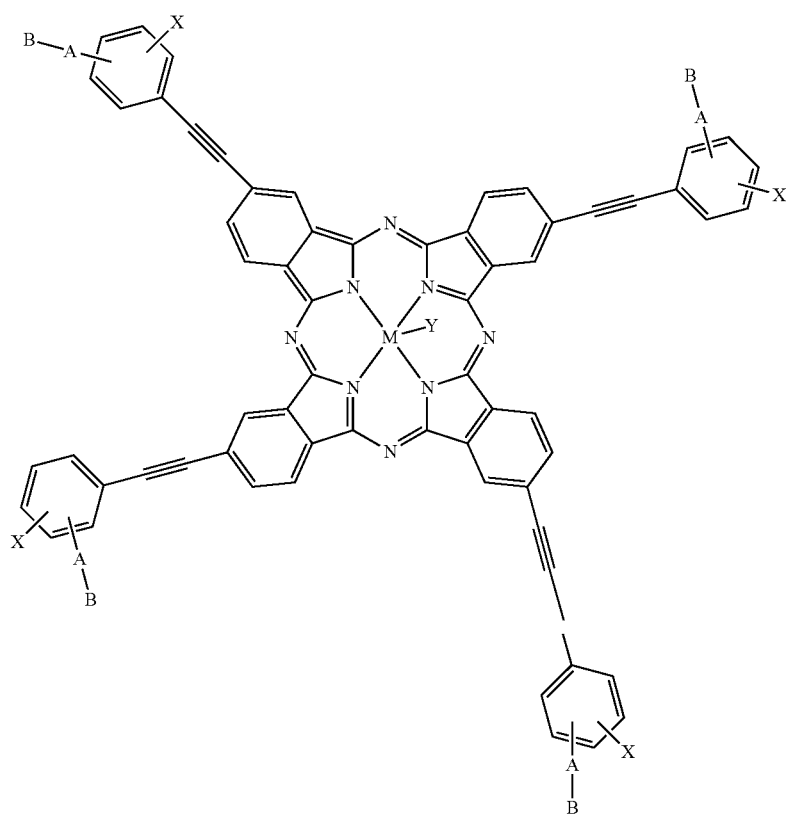

-continued

Formula IV:

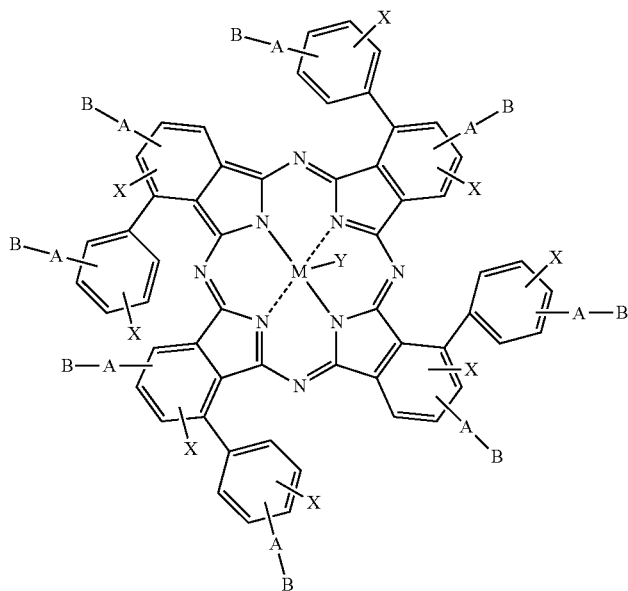

wherein the phthalocyanine compound in any of Formulas I, II, III and IV comprises either phthalocyanine or naphthalocyanine, where X is independently selected from the group consisting of COOZ, $SO_3Z$, $PO_3Z$, $NR_3^+Y^-$, and $(CH_2CH_2O)_mCH_3$, where Z is independently selected from the group consisting of H, a monovalent metal ion, and $NR_4^+$; R is independently selected from the group consisting of H, an alkyl group, a substituted alkyl group, an aryl group and a substituted aryl group; Y is independently selected from the group consisting of a halogen, sulfate, sulfonate, OH, $OSO_3Z$, and OCOR, and m ranges from 1 to 500;

where A is a divalent linking group independently selected from the group consisting of O, $CH_2$, NH, COO, CONH, CO, $SO_3$ and $SO_2NH$;

where B is a monovalent group independently selected from the group consisting of hydrogen, an alkyl group, a substituted alkyl group, an aryl group and a substituted aryl group; and where M is a trivalent or a tetravalent metal, wherein the extended conjugation shifts absorption of the phthalocyanine dye to greater than 800 nm.

10. The phthalocyanine dye of claim 9, wherein any of the phthalocyanine compounds of the Formulas I, II, III and IV are independently an oligomer with 1 to 6 monomers of one or both of phthalocyanine and naphthalocyanine.

11. A phthalocyanine dye with extended conjugation that shifts absorption of the phthalocyanine dye to greater than 800 nm, the dye comprising a phthalocyanine compound having one or both of a phthalocyanine component and a naphthalocyanine component and that is an oligomer comprising one of or any combination of two or more of:

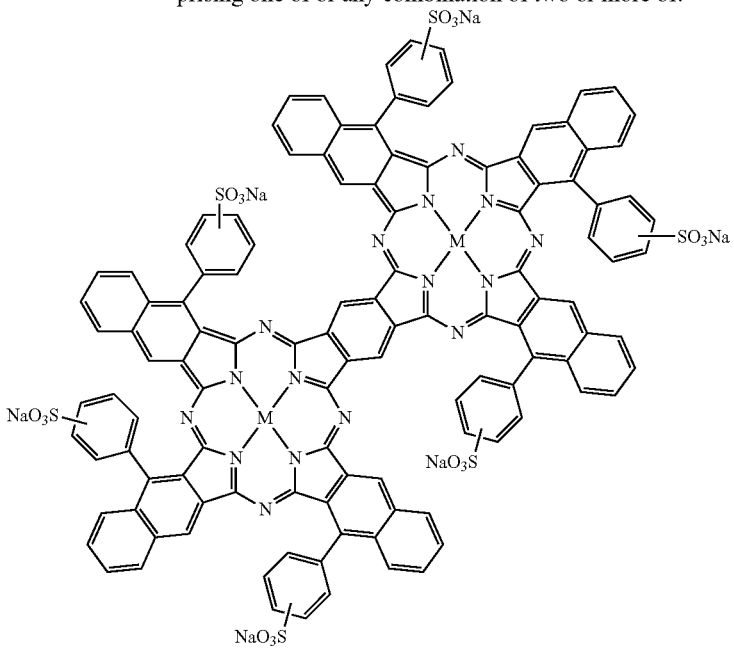

where M is In—OSO$_3$Na;
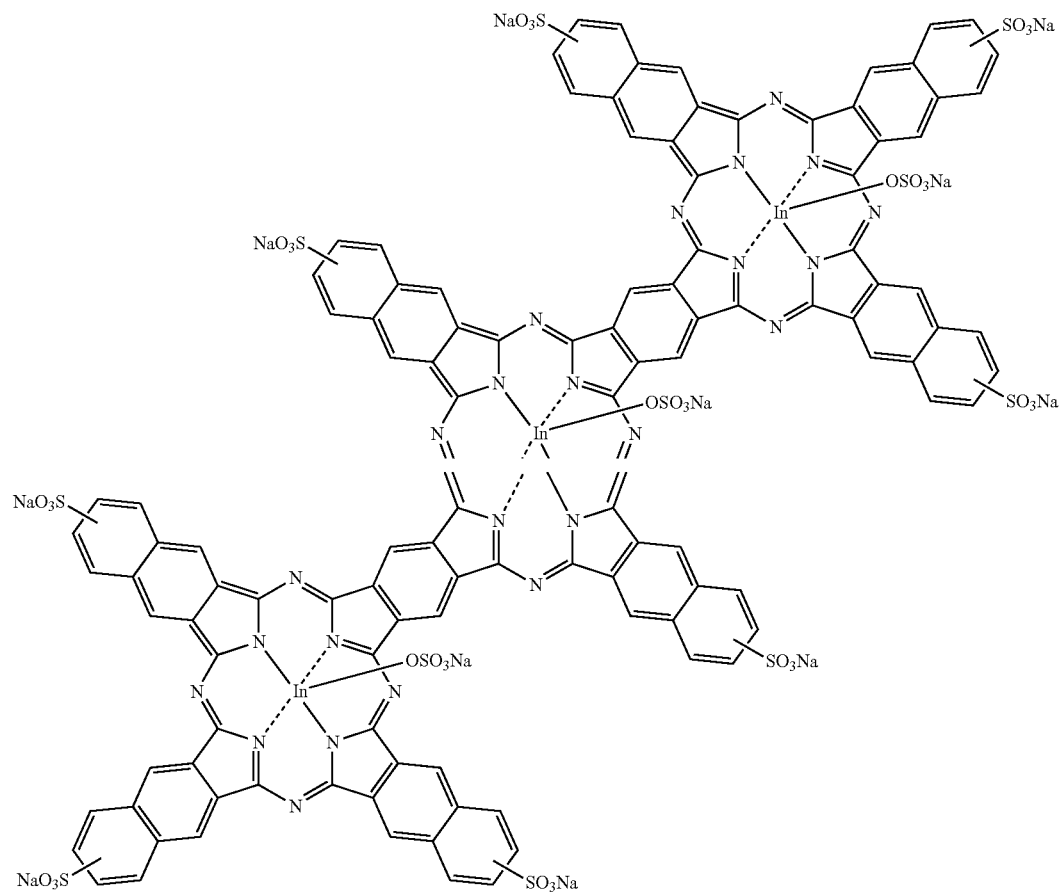
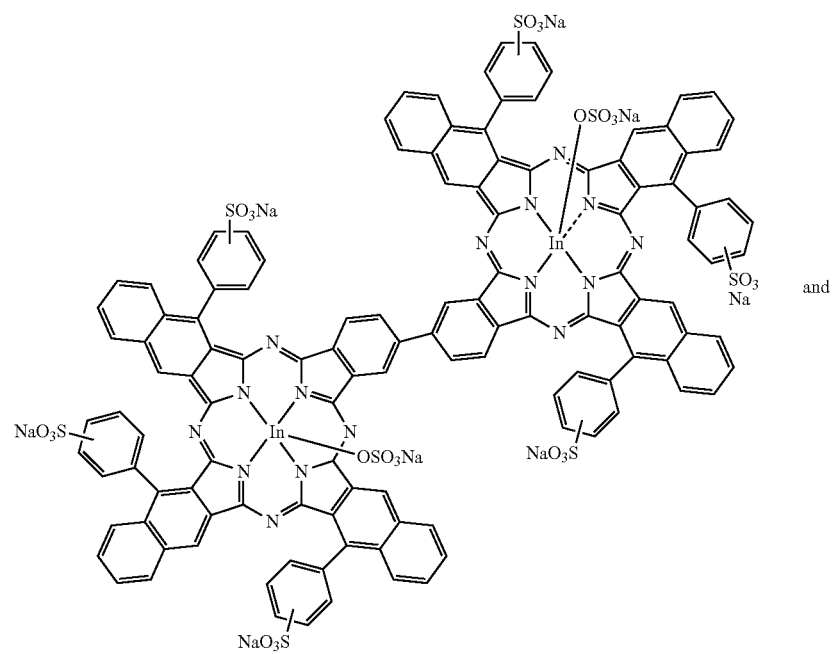
and

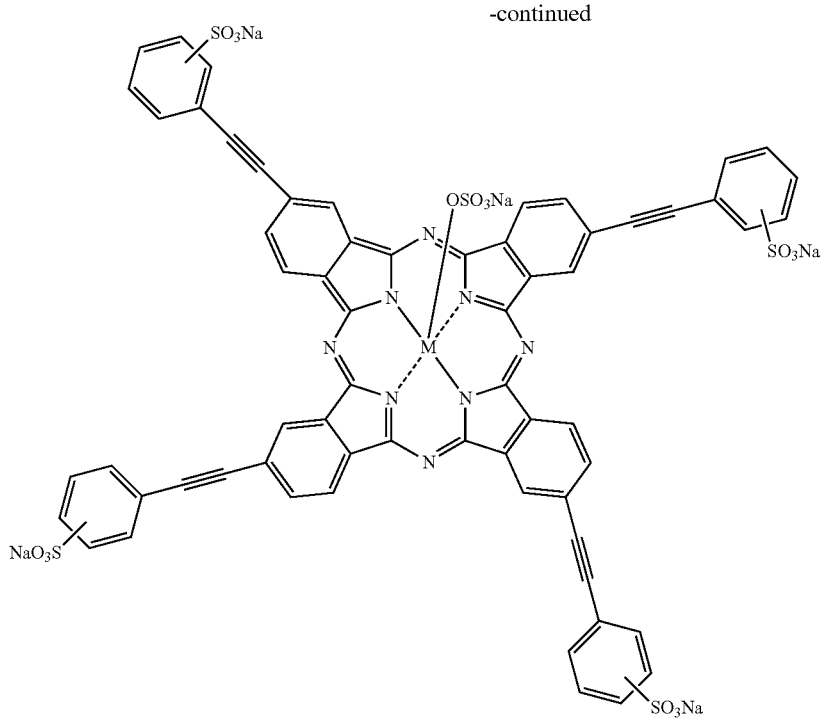

where M is In.

12. An inkjet ink formulation comprising:
an inkjet ink; and
a phthalocyanine dye with extended conjugation either soluble or dispersed in the inkjet ink, the phthalocyanine dye being stable in the inkjet ink for a shelf life of the inkjet ink, the phthalocyanine dye comprising one or both of a phthalocyanine component and a naphthalocyanine component and at least one water soluble substituent on an aryl group of the phthalocyanine dye,
wherein the extended conjugation of the phthalocyanine dye comprises one of (a) at least three benzene moieties of the component each being joined to an aryl group indirectly using an alkynyl linkage, (b) at least one benzene moiety of the component being directly joined to a benzene moiety of another of the components in a biphenyl linkage or shared between the respective components to form an oligomer of the components, and (c) a combination of (a) and (b), the extended conjugation shifting absorption of the phthalocyanine dye to greater than 800 nm.

13. The inkjet ink formulation of claim 12, wherein the inkjet ink is water soluble, the phthalocyanine dye being soluble and stable in the water soluble inkjet ink.

14. The phthalocyanine dye of claim 1, wherein the at least three of the benzene moieties of the component each is joined to an aryl group indirectly using an alkynyl linkage to extend the conjugation of the phthalocyanine dye.

15. The phthalocyanine dye of claim 1, wherein three benzene moieties of the component each is indirectly joined to an aryl group using an alkynyl linkage, and wherein one other benzene moiety of the component is directly joined to a benzene moiety of another of the components in a direct biphenyl linkage to form the oligomer of the components in the combination (c).

16. The phthalocyanine dye of claim 1, wherein three benzene moieties of the component each is indirectly joined to an aryl group using an alkynyl linkage, and wherein one other benzene moiety of the component is shared with another component to form the oligomer of the respective components in the combination (c).

17. A phthalocyanine dye with extended conjugation comprising:
a phthalocyanine compound comprising one or both of a phthalocyanine component and a naphthalocyanine component;
a metal complexed with a pyrrole moiety of the component at a nucleus of the component, the metal being one of a divalent metal, a trivalent metal or a tetravalent metal, and wherein the metal is further bonded to one or more groups selected from the group consisting of halogen, sulfate, sulfonate, hydroxyl, $OSO_3Z$, and OCOR, where Z is selected from the group consisting of a hydrogen ion, a monovalent metal ion, and $NR_4^+$, and where R is independently selected from the group consisting of hydrogen, alkyl, aryl, a substituted alkyl, and a substituted aryl; and
at least one water soluble substituent on an aryl group of the phthalocyanine dye,
wherein the extended conjugation of the phthalocyanine dye comprises at least one benzene moiety of the component being either directly joined to a benzene moiety of another of the components in a direct biphenyl linkage or shared between the respective components to form an oligomer of the components, the extended conjugation shifting absorption of the phthalocyanine dye to greater than 800 nm.

18. The phthalocyanine dye of claim 17, wherein the phthalocyanine compound comprises a chemical structure of one of:

Formula I:

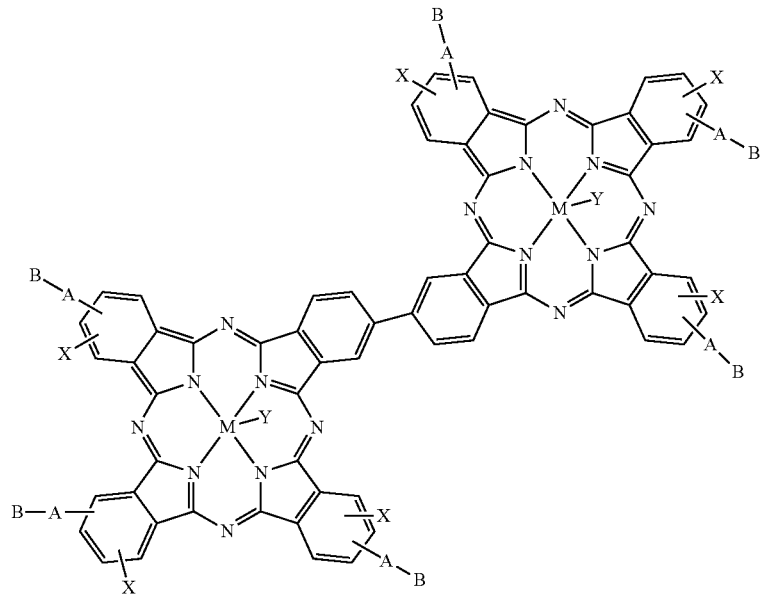

Formula II:

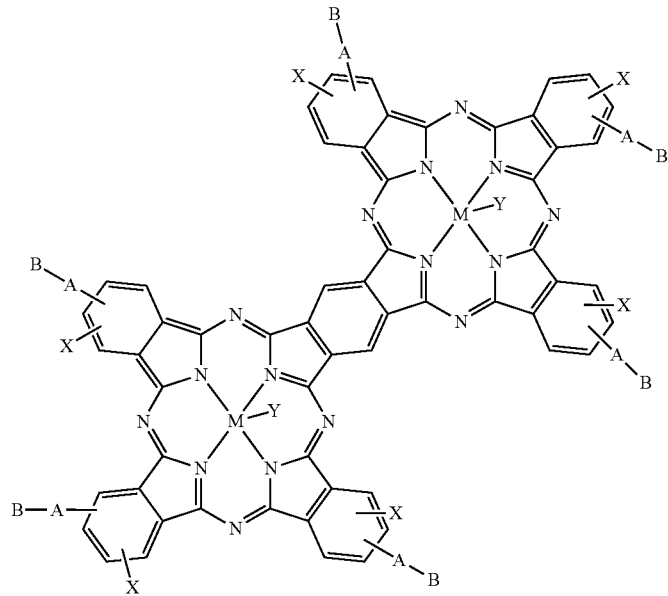

and combinations of Formula I and II, where X is independently selected from the group consisting of COOZ, $SO_3Z$, $PO_3Z$, $NR_3^+Y^-$, and $(CH_2CH_2O)_mCH_3$, where Y is independently selected from the group consisting of a halogen, sulfate, sulfonate, OH, $OSO_3Z$, and OCOR, and m ranges from 1 to 500;

where A is a divalent linking group independently selected from the group consisting of O, $CH_2$, NH, COO, CONH, CO, $SO_3$ and $SO_2NH$; and where B is a monovalent group independently selected from the group consisting of hydrogen, an alkyl group, a substituted alkyl group, an aryl group and a substituted aryl group.

19. A detection system comprising:

a near infrared (NIR) illumination source;

a medium that comprises a phthalocyanine dye with expanded conjugation, wherein the phthalocyanine dye comprises a component of one or both of phthalocyanine and naphthalocyanine, and at least one water soluble substituent on an aryl group of the phtalocyanine dye, the extended conjugation comprising one of (a) at least three benzene moieties of the component each being joined to an aryl group indirectly using an alkynyl linkage, (b) at least one benzene moiety of the component being directly joined to a benzene moiety of another of the components in a biphenyl linkage or shared between the respective components to form an oligomer of the components, and (c) a combination of (a) and (b), the extended conjugation shifting absorption of the dye to greater than 800 nm; and an NIR sensor that detects absorption of the phthalocyanine dye in the medium illuminated by the NIR illumination source.

20. The detection system of Claim 19, wherein the medium is an inkjet ink formulation, the phthalocyanine dye being both dispersed in the inkjet ink formulation and stable in the inkjet ink formulation for a shelf life of the inkjet ink formulation, and wherein the NIR illumination source is directed at a nozzle output of an inkjet print head of a inkjet printer, the NIR sensor detecting a presence or an absence of the inkjet ink formulation at the nozzle output with the phthalocyanine dye absorption, the NIR sensor communicating with the inkjet printer.

* * * * *

UNITED STATES PATENT AND TRADEMARK OFFICE
CERTIFICATE OF CORRECTION

PATENT NO.        : 8,778,073 B2                                             Page 1 of 2
APPLICATION NO.   : 13/126337
DATED             : July 15, 2014
INVENTOR(S)       : Sivapackia Ganapathiappan et al.

It is certified that error appears in the above-identified patent and that said Letters Patent is hereby corrected as shown below:

In the Claims

In column 23-24, line 2, in Claim 11, delete

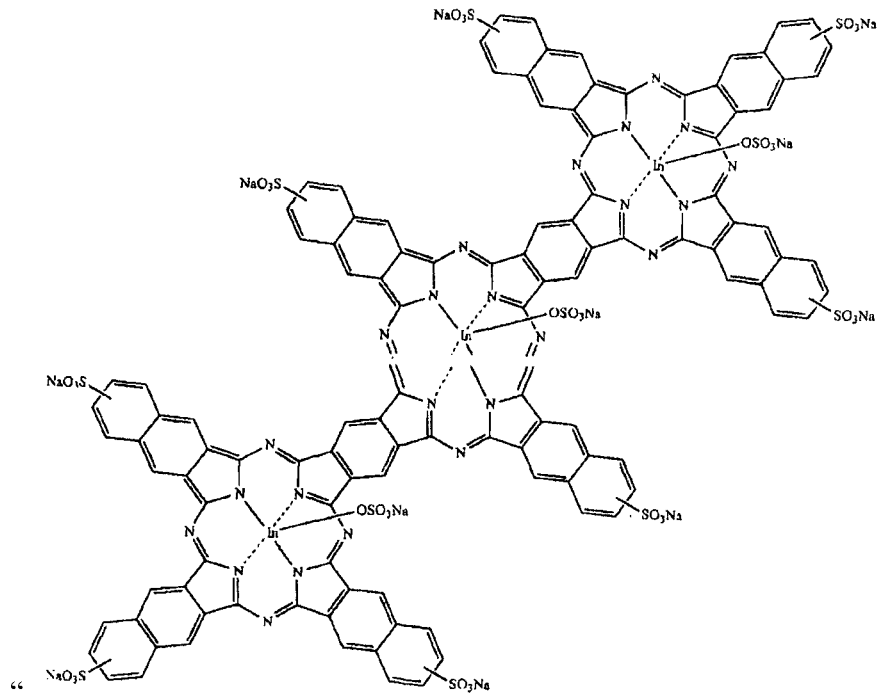

" and

Signed and Sealed this
Tenth Day of March, 2015

Michelle K. Lee
*Deputy Director of the United States Patent and Trademark Office*

CERTIFICATE OF CORRECTION (continued)
U.S. Pat. No. 8,778,073 B2

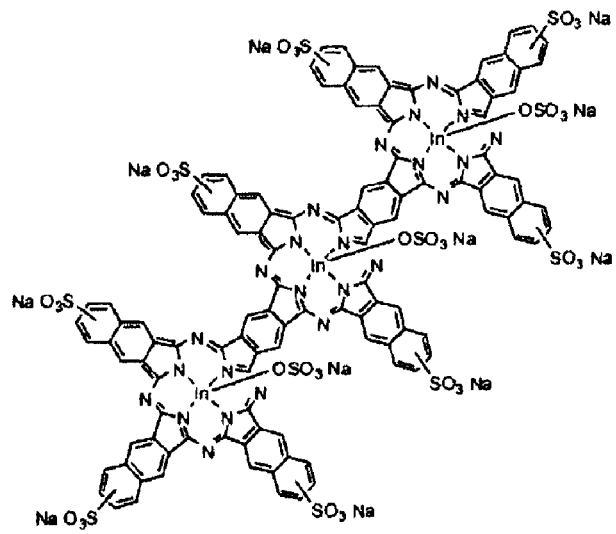

insert --             --, therefor.

In column 28, line 59, in Claim 19, delete "expanded" and insert -- extended --, therefor.

In column 28, line 62, in Claim 19, delete "phtalocyanine" and
insert -- phthalocyanine --, therefor.

In column 29, line 14, in Claim 20, delete "a" and insert -- an --, therefor.